Sept. 27, 1955 B. M. GORDON 2,719,227
COUNTING APPARATUS
Filed June 9, 1951
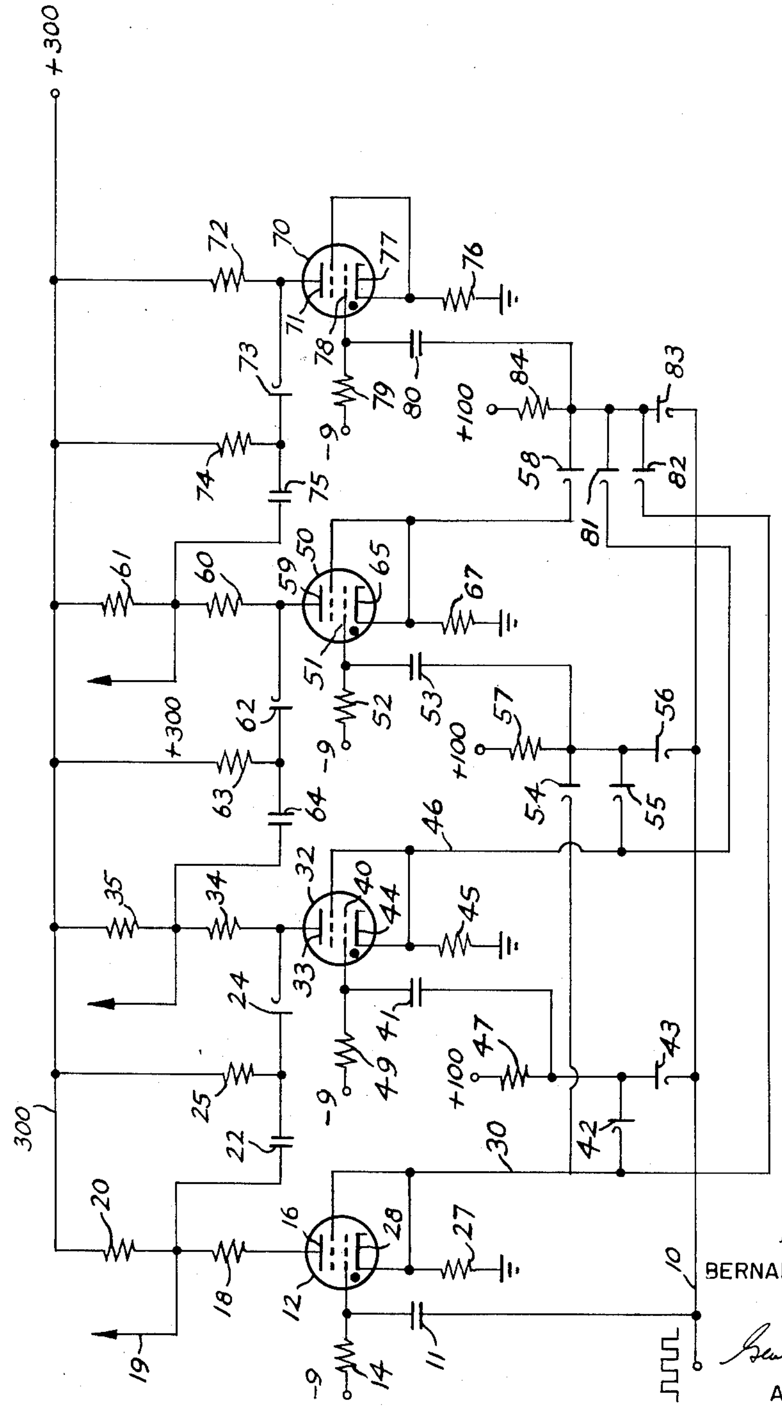
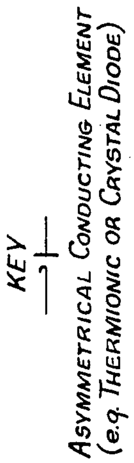
INVENTOR.
BERNARD M. GORDON
George V. Eltgroth
ATTORNEY 2,719,227
Patented Sept. 27, 1955

2,719,227

COUNTING APPARATUS

Bernard M. Gordon, Philadelphia, Pa., assignor, by mesne assignments, to Sperry Rand Corporation, a corporation of Delaware Application June 9, 1951, Serial No. 230,789
9 Claims. (Cl. 250—27)

This invention relates to apparatus responsive to electrical impulses and more particularly to impulse controlled apparatus responding sequentially in predetermined manner to the arrival of a succession of such impulses.

The art is familiar with several types of counters having the property of sequentially responding in unique manner to successively arriving impulses. Such devices may be conveniently divided into two classes; rings and cascaded binary combinations. Counting rings are characterized by the presence of a number of electrode groups at least equal in number to the maximum quantity to be accommodated by the ring counter, whereas counters made up of a series of cascaded binary groups have a number of stages corresponding to the number of binary places in the maximum quantity to be accommodated. For the counting of large quantities, therefore, the cascaded binary unit offers the only practical approach. Usually, each of the binary stages in the cascaded group employs two or more vacuum tubes. It is desirable to reduce to a minimum the number of electric valves used in the binary counter, and accordingly some single tube binary counters have been developed. Their characteristics, however, do not lend themselves to cascade connection of such counters. In addition, many counters require special input provisions for satisfactory operation which call for additional electronic valves. It is further desirable to eliminate such coupling valves or, at least, reduce them in number and make them of a type characterized by the utmost in reliability.

Accordingly, one of the principal objects of the invention is to provide new and novel electrical impulse responsive apparatus.

Another object of the invention is to provide new and novel counting apparatus incorporating a single valve per counting stage.

A further object of the invention is to provide improved input circuit arrangements for feeding cascaded counter stages.

Yet another object of the invention is to provide an improved gas discharge tube counter.

Still another object of the invention is to provide a new and novel recycling counter comprising a number of cascade-connected binary counting stages.

Still another object of the invention is to provide new and novel circuit arrangements for transferring an electric discharge between electric valves.

Other objects of the invention will in part be obvious and in part be discussed as the following specification is read in connection with the single figure drawing schematically describing a circuit illustrating the principles of the invention.

While thermionic tubes have been used in the illustrative example disclosing the principles of the invention, the drawing has been simplified by the omission of the heater circuits normally associated with such devices and the details of power supplies therefor. The references to the operating potentials have been standardized in the following manner: each power supply bus is designated by a reference character whose value is equal to the magnitude of the voltage concerned. Positive voltages are indicated by even numbered reference characters while negative voltages are indicated by odd numbered reference characters. Power supply leads may be provided with the decoupling and filtering circuits familiar in current engineering practice. Component values, operating potentials, and specific tube types, where mentioned, are by way of example only, to assist in understanding the application of the invention in a particular form. They may, of course, be varied to meet the specific requirements in various applications.

The signals to be counted are applied to the apparatus over the control signal line 10 coupled through capacitor 11 which may be about 1000 mmfd. with the control grid of a thyratron valve 12, which may, like the balance of the valves in the apparatus, be of a type commercially designated 2050. A grid resistor 14 (of about 100,000 ohms) may be bridged between the control grid of the valve 12 and the negative supply bus 9. The anode 16 of the valve 12 is connected through a resistor 18, which may be of the order of 1000 ohms, and resistor 20 which may be about 27,000 ohms, to the positive supply bus 300. The lead 19 from the junction of the resistors 18 and 20 may be brought out to any suitable visual indicator or other driven circuit. The junction is also connected through capacitor 22 which may be about 0.1 mfd. with the anode of a diode 24 returned to the positive supply bus 300 through a resistor 25 of about 100,000 ohms. A resistor 27, of perhaps 1,000 ohms, is connected between the cathode 28 of the valve 12 and ground. The cathode 28 is also connected over the gating line 30 with several other elements later to be described.

The second stage of the counter includes a further thyratron valve 32, whose anode 33 is returned to the positive supply bus 300 through resistors 34 and 35 having magnitudes corresponding respectively to resistors 18 and 20. In addition, the anode 33 of the valve 32 is connected with the cathode of the unilateral conductor 24. The unilateral conductor 24, like the balance of the unilateral conductors to be mentioned in the description, may be a germanium or selenium diode or may itself be a small thermionic valve, the selection being controlled by considerations of cost, size, and operating frequency. The component values given throughout by way of example are proportioned for use with existing germanium diodes.

The control grid 40 of the valve 32 is coupled through capacitor 41, of about 1000 mmfd., with the anodes of diodes 42, 43, the junction point being returned to the positive supply bus 100 through a resistor 47 of about 33,000 ohms. The cathode of the diode 42 is fed from the cathode line 30 driven by the cathode 28 of the valve 12 and the cathode of the diode 43 is fed from the control signal line 10. The cathode 44 of the valve 32 may be connected with ground through a resistor 45 of about 1000 ohms, and drives the conductor 46 connected with the cathodes of gating diodes 55 and 81.

The valve 50, forming a third stage in the counting arrangement, has a control grid 51 returned to the negative supply bus 9 through a resistor 52 and coupled through capacitor 53 with the anodes of diodes 54, 55, and 56. As before, the common anodes of the diodes 54, 55, and 56 may be returned to the positive supply bus 100 through a resistor 57 of about 33,000 ohms. A resistor 67 of about 1000 ohms connects the cathode of the valve 50 with ground, and the cathode side of the said resistor 67 is linked to the cathode of a diode 58. The anode 59 of the valve 50 is fed from the positive supply bus 300 through resistors 60 and 61, and the anode is further connected with the cathode of a diode 62 whose anode is likewise returned to the positive supply bus 300 through a resistor 63. The diode end of the resistor 63 is coupled through a capacitor 64 which may be about 0.1 mfd. with the junction point between resistors 34 and 35 in the anode circuit of the valve 32.

The arrangement of valves and gates just described constitutes a nonrestoring form of counter which may be reset to zero by the removal and reapplication of anode potential while the grid bias voltage remains undisturbed. The addition of a further valve 70 permits automatic return of the counter to the initial reference condition under the influence of continuously arriving impulses. The valve 70 includes an anode 71 connected with the positive supply line 300 through the resistor 72 which may have a value of about 250,000 ohms. A diode 73 has its cathode connected with the anode 71 and its anode connected with the positive supply bus 300 through a resistor 74 of about 100,000 ohms. The junction between the anode of the diode 73 and the resistor 74 may be coupled with the junction between resistors 60 and 61 in the anode circuit of the valve 50 via a capacitor 75 of about 0.1 mfd.

The cathode of the valve 70 is connected with ground through a resistor 76 of about 1,000 ohms, while the control grid 78 is coupled with the negative supply bus 9 through a resistor 79 which may be about 100,000 ohms. A capacitor 80 of about 1,000 mmfd. couples the control grid 78 of the valve 70 with the anodes of the diodes 58, 81, 82, and 83. In addition, the junction of the said anode diodes may be returned to the positive supply bus 100 through a resistor 84 of about 33,000 ohms. The cathode of the diode 58 is linked to the cathode 65 of the valve 70, as previously noted. The cathode of the diode 81 is driven over the line 46 from the cathode 44 of the valve 32, and the cathode of the diode 82 is driven over line 30 from the cathode 28 of the valve 12. The control signal line 10 is connected to the cathode of the diode 83.

In considering the operation of the circuit, it will be helpful to remember that the source feeding the control signal line 10 delivers signals proceeding positively from a base line which is either at ground potential or somewhat negative with respect thereto and preferably has an internal impedance low by comparison with the values of resistors 47, 57, and 84 which, in the illustrative showing have been assigned values of the order of 33,000 ohms. The apparatus is placed in service by energizing heating circuits (not shown) and applying operating potentials to the appropriate electrodes of the valves. Preferably, the time constant of the negative bias supply circuits is less than the time constant of the anode supply circuits, to insure that all valves are initially nonconductive. If the impulses appearing on the control signal line are characterized by a high duty cycle, the values of the coupling capacitors feeding the control electrodes of the various valves and their associated grid returns are preferably such as to perform a differentiating operation on the control signal. If the signals on the control signal line 10 have a low duty cycle, this requirement need not be met. The values cited by way of example perform the differentiating operation referred to for frequencies below 2500–5000 cycles per second.

The first positive-going impulse arriving on the control signal line 10 is impressed on the cathodes of the diodes 43, 56, and 83 and is also delivered directly to the control grid of the valve 12 through the coupling capacitor 11. It has been assumed that all the valves 12, 32, and 50 are nonconductive, whereby their cathodes are substantially at ground potential, so that, even although the cathode of, say, diode 43 swings positively 10 volts with respect to ground, the shunting action of the conductive diode 42, acting in conjunction with the limiting resistance of the resistor 47, and because of the relatively low resistance of resistor 27, restrains the input lead to the capacitor 41 from rising appreciably above ground potential. The same is true of the input leads to capacitors 53 and 80. However, no such restraint operates on the input to capacitor 11, so that positive-going impulses are applied to the control electrode of the valve 12 firing the thyratron 12 to initiate the flow of current in its anode-cathode circuit. The resistances 18, 20, and 27 are low enough in magnitude to permit the stable flow of current through the valve 12, once it has been fired. At the instant of firing, a negative-going excursion is transmitted from the anode 16 through the capacitor 22 to the anode of diode 24. However, as this makes the anode of diode 24 negative with respect to its associated cathode, no appreciable voltage impulse is delivered to the anode 33 of the valve 32. The establishment of current flow through the thyratron 12 raises the potential of the cathode 28 substantially above ground, elevating the potential of the cathodes of the diodes 42, 54, and 82. Thus, after the first impulse, the illustrative circuit is left with valve 12 conductive and valves 32, 50 and 70 nonconductive.

The next positive-going impulse arriving over the line 10 also drives the control grid of the valve 12 positive but, since the valve 12 is already conductive, this is without any immediate effect on its operation. At the same time, the cathode of the diode 43 swings positively and, since the cathode of diode 42 is also positive, the flow of current through the limiting resistor 47 is decreased sufficiently to transmit the positive-going surge to the input of the capacitor 41, delivering a positive-going impulse to the control grid 40 of the valve 32, initiating conduction therein. Conduction through the valve 32 drops the potential of the anode 33 from 300 volts positive to a relatively low value of the order of 30 volts. The cathode of the diode 24 connected with the anode 33 of the valve 32 now becomes negative with respect to its associated anode and reduces the potential of the junction between capacitor 22 and resistor 25 to approximately the 30 volt level transmitting a negative surge of about 200 volts through the capacitor 22 to the anode 16 of the valve 12. The anode 16 which was at a potential of about 30 volts positive is driven strongly negative with respect to the associated cathode 28, to extinguish the discharge through the valve 12. Because of the differentiating action of capacitor 11 and resistor 14, the positive-going impulse applied to the control grid of the valve 12 has already disappeared before this action occurs. The time constant of the circuits including the capacitor 22 is sufficiently long with respect to the time constant of the capacitor 11 and resistor 14 to insure reliable extinguishing of the discharge in the valve 12. Of course, where the positive-going impulses supplied to the line 10 have very low duty cycle, the guarantee of satisfactory operation provided by the differentiation occurring in capacitor 11 and resistor 14 may be dispensed with.

The same impulse that fires the valve 32 finds its passage to the control grid 51 of the valve 50 and the control grid 78 of the valve 70 halted by virtue of the clamping action of the diode 55 joining the junction of resistor 57 and capacitor 53 and by the clamping action of the diode 81 joining the junction of the capacitor 80 and resistor 84 with the cathode driven line 46 of the valve 32, respectively. After the receipt of the second positive-going impulse on the control signal line 10, therefore, the conduction pattern in the illustrative circuit is, valve 32 on, valves 12, 50 and 70 off.

The third positive-going impulse applied to the line 10 reaches the control grid of the valve 12, which is now nonconductive, and initiates conduction therein. While the anode 16 swings negatively in response to the establishment of such conduction, and transmits a negative impulse to the capacitor 22, the rectifying action of the diode 24 prevents the negative-going surge from reaching the anode 33 where it would otherwise extinguish the flow of current through the valve 32. The said third positive-going impulse on the control signal line 10 is prevented from reaching the control grid 51 of the valve 50 by reason of the previously existing nonconducting state of the valve 12, which has maintained the cathode of the diode 54 at or below ground potential to prevent the positive-going signal delivered to the cathode of diode 56 from being reflected as a rise in potential of the diode end of the resistor 57. The reliability of this phase of the operation may be enhanced by the introduction of a small delay element in the line driving the cathode of the diode 54, if necessary. The passage of the positive-going signal from line 10 to the control grid 78 of the valve 70 through the diode 83 is prevented, not only by diode 82 acting in a manner similar to the diode 54, but also by shunting action of the diode 58 which is connected with the cathode 65 of the then nonconductive valve 50. The third positive-going control signal therefore leaves the illustrated circuit with valves 12 and 32 in the conductive state and valves 50 and 70 in the nonconductive state.

The fourth signal on the control line 10 reaches both the control grid of the valve 12 and control grid 40 of the valve 32 but, since they are already conductive, does not alter the circuit condition. However, the cathodes of diodes 54 and 55 were both rendered positive by virtue of the conduction in the valves 12 and 32 so that the positive-going impulse on the line 10 is reflected through the gating diode 56 to cause a rise in potential of the diode end of the resistor 57, delivering a corresponding positive-going signal to the control grid 51 of the valve 50. This establishes conduction in the valve 50, lowering its anode potential to about thirty volts, which makes the cathode of the diode 62 negative with respect to its associated anode to transmit the negative-going 270 volt surge through capacitor 64 to the anode 33 of a valve 32 to extinguish conduction therethrough. The same negative-going impulse is also transmitted through the diode 24 and capacitor 22 to the valve 12 with the same effect. The same considerations of time constant govern the selection of capacitor 64 and its associated resistors as govern capacitor 22 and its associated resistors.

With the foregoing analysis as a guide in developing the principles of the operation of the circuit, its response to further sequentially arriving impulses will be apparent and may be readily deduced. The response pattern of the system may be summarized in the following table:

| Pulse No. | Valve 12 | Valve 32 | Valve 50 |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

In the foregoing table, "1" denotes the conductive state, while "0" denotes the nonconductive state.

If it is desired that the counter automatically recycle when it has reached the limit of its capacity, a valve arrangement such as that shown at 70 may be provided. Assuming now that all the valves 12, 32, and 50 are conductive, the cathodes of diodes 58, 81, and 82 are all positive so that the next positive-going signal on the line 10, acting through the diode 83, reduces the flow of current through the resistor 84 sufficiently to transmit the positive-going surge to the control electrode 78 of the valve 70. The valve 70 may have a much higher resistance in its anode circuit, the value being sufficiently high to prevent the discharge in the valve 70 from being self-sustaining.

The self-extinguishing action of the valve 70 may be enhanced by the introduction of an inductor in the anode circuit, or other devices may be employed, which are characterized by a normal state than can be triggered into an abnormal state, returning to the normal state after a predetedmined period of time, may be employed.

With the initiation of conduction in the anode-cathode circuit of the valve 70, the potential of the anode 70 drops from the 300 volt positive level to a voltage only slightly positive with respect to ground. It will be recollected that all the valves 12, 32, 50 have been assumed conductive, so that the anodes for each of these devices have been approximately 30 volts positive with respect to ground. Accordingly, a negative-going surge betwen 250 and 300 volts is delivered through the diode 73 to the capacitor 75 which transmits it to the anode 59 of the valve 50, to drive the said anode 59 negative and extinguish the discharge from the valve 50. While the anode 59 is driven negative, the negative surge is also transmitted through the diode 62 and capacitor 64 to the anode 33 of the valve 32 and through the diode 24 and capacitor 22 to the anode 16 of the valve 12. Accordingly, at the same time, both the valves 12 and 32 are also rendered nonondutive, restoring the assumed initial state.

The values of components and operating potentials recited in the specification are purely illustrative and may be varied to meet the requirements of other electric valves or other operating conditions. It is to be further understood that the time constants of the various circuits may be proportioned by the application of well-known engineering considerations to meet the requirements of various types and frequencies of control signals.

Many other variations and modifications of the invention not departing essentially from the spirit thereof will be immediately obvious to those skilled in the art when faced with the requirements of particular environments and types of service.

What is claimed is:

1. In combination, first and second electric circuits, each of said circuits being characterized by two stable states and adapted to change from one of said states to the other in response to a control signal, a control signal line, a coupling link connected between said control signal line and said first electric circuit delivering state changing signals from said control signal line to said first electric circuit, a gating circuit characterized by control signal translating and non-translating properties connected between said control signal line and said second electric circuit, said gating circuit being operative to deliver state changing signals from said control signal line to said second electric circuit in response to the existence of one state in said first electric circuit and being operative to block state changing signals from said control signal line to said second electric circuit in response to the existence of a second state in said first electric circuit, and apparatus altering the electric state of said first electric circuit in response to the presence of a predetermined electric state in said second electric circuit.

2. In signal responsive apparatus, first and second circuits characterized by mutually exclusive electric states and adapted to change from one of said states to another in response to a control signal, a control signal line, a first coupling link delivering state changing signals from said control signal line to said first electric circuit, a second coupling link conditioned for operability by the existence of a predetermined state in said first electric circuit delivering signals capable of changing the electric state of said second electric circuit from said control signal line to said second electric circuit, apparatus altering the electric state of said first electric circuit in response to the presence of a predetermined electric state in said second electric circuit, a third electric circuit characterized by mutually exclusive electric states and adapted to change from one of said states to another in response to a control signal, a third coupling link conditioned for operability by the existence of predetermined states in said first and second electric circuits delivering signals capable of changing the electric state of said second electric circuit from said control signal line to said third electric circuit, and apparatus altering the electric state of said first and second electric circuits in response to the presence of a predetermined state in said third electric circuit.

3. In signal responsive apparatus, a first trigger valve having a cathode, a control electrode and an anode, impedances connecting the anode-cathode circuit of said first trigger valve to a source of electric potential, a second trigger valve having a cathode, a control electrode and an anode, impedances connecting the anode-cathode circuit of said second trigger valve to a source of electric potential, a control signal line, a coupling device linking said control signal line with said first control electrode, and a coupling link conditioned for operability by the existence of a predetermined condition in said first anode-cathode circuit connected between said control signal line and said second control electrode.

4. In signal responsive apparatus, a first trigger valve having a cathode, a control electrode and an anode, impedances connecting the anode-cathode circuit of said first trigger valve to a source of electric potential, a second trigger valve having a cathode, a control electrode and an anode, impedances connecting the anode-cathode circuit of said second trigger valve to a source of electric potential, a control signal line, a coupling device linking said control signal line with said first control electrode, a coupling link conditioned for operability by the existence of a predetermined condition in said first anode-cathode circuit connected between said control signal line and said second control electrode, and a unilateral conductor connected between said first and second anodes.

5. The combination according to claim 4, in which a capacitor is connected in series with said unilateral conductor between said first and second anodes.

6. In signal responsive apparatus, a first trigger valve having a cathode, a control electrode and an anode, impedances connecting the anode-cathode circuit of said first trigger valve to a source of electric potential, a second trigger valve having a cathode, a control electrode and an anode, impedances connecting the anode-cathode circuit of said second trigger valve to a source of electric potential, a control signal line, a coupling device characterized by a first time constant linking said control signal line with said first control electrode, a coupling link conditioned for operability by the existence of a predetermined condition in said first anode-cathode circuit connected between said control signal line and said second control electrode, and a unilateral conductor connected in series with a capacitor between said first and second anodes, said capacitor in conjunction with its associated circuits having a time constant greater than said first time constant.

7. In signal responsive apparatus, a first ionic discharge valve having a cathode, a control electrode and an anode, an impedance connecting said first cathode with a first electric potential, an impedance connecting said first anode with a second electric potential, a control signal line, a coupling link connected between said control signal line and said first control electrode, a second ionic discharge valve having a cathode, a control electrode and an anode, an impedance connecting said second cathode with a third electric potential, an impedance connecting said second anode with a fourth electric potential, a first unilateral conductor having its cathode connected with said first cathode and its anode connected with said second control electrode, and a second unilateral conductor having its cathode connected with said control signal line and its anode connected with said second control electrode.

8. In signal responsive apparatus, a first ionic discharge valve having a cathode, a control electrode and an anode, an impedance connecting said first cathode with a relatively negative electric potential, an impedance connecting said first anode with a relatively positive electric potential, a control signal line, a coupling link connected between said control signal line and said first control electrode, a second ionic discharge device having a cathode, a control electrode and an anode, an impedance connecting said second cathode with a relatively negative potential, an impedance connecting said second anode with a relatively positive potential, a first unilateral conductor having its cathode connected with said first cathode and its anode connected with said second control electrode, a second unilateral conductor having its cathode connected with said control signal line and its anode connected with said second control electrode, and a third unilateral conductor having its anode connected with said anode of said first valve and its cathode connected with said anode of said second valve.

9. In signal responsive apparatus, a first ionic discharge valve having a cathode, a control electrode and an anode, an impedance connecting said cathode of said first valve with a relatively negative electric potential, an impedance connecting said anode of said first valve with a relatively positive electric potential, a control signal line, a coupling link connected between said control signal line and said control electrode of said first valve, a second ionic discharge device having a cathode, a control electrode and an anode, an impedance connecting said cathode of said second valve with a relatively negative potential, an impedance connecting said anode of said second valve with a relatively positive potential, a first unilateral conductor having its cathode connected with said cathode of said first valve and its anode connected with said control electrode of said second valve, a second unilateral conductor having its cathode connected with said control signal line and its anode connected with said control electrode of said second valve, a third unilateral conductor having its anode connected with said anode of said first valve and its cathode connected with said anode of said second valve, a third ionic discharge valve having a cathode, a control electrode and an anode, a connection linking said cathode of said third valve with a relatively negative potential, an impedance connecting said anode of said third valve with a relatively positive potential, a fourth unilateral conductor having its cathode connected with said cathode of said first valve, and its anode connected with said control electrode of said third valve, a fifth unilateral conductor having its cathode connected with said cathode of said second valve and its anode connected with said control electrode of said third valve, a sixth unilateral conductor having its cathode connected with said control signal line and its anode connected with said control electrode of said third valve, and a seventh unilateral conductor having its anode connected with said anode of said second valve and its cathode connected with said anode of said third valve.

References Cited in the file of this patent

UNITED STATES PATENTS

| | | |
|---|---|---|
| 2,422,583 | Mumma | June 17, 1947 |
| 2,540,442 | Grosdoff | Feb. 6, 1951 |